US012229820B2

(12) United States Patent
Obana et al.

(10) Patent No.: US 12,229,820 B2
(45) Date of Patent: Feb. 18, 2025

(54) INFORMATION PROCESSING SYSTEM, INFORMATION PROCESSING METHOD, PROGRAM, AND RECORDING MEDIUM

(71) Applicant: GURUNAVI, INC., Tokyo (JP)

(72) Inventors: Koji Obana, Tokyo (JP); Airi Kato, Tokyo (JP); Risako Iwata, Tokyo (JP); Jiro Hashimoto, Tokyo (JP); Yui Hamatani, Tokyo (JP); Kotaro Saito, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 0 days.

(21) Appl. No.: 17/419,782

(22) PCT Filed: Sep. 9, 2020

(86) PCT No.: PCT/JP2020/034143
§ 371 (c)(1),
(2) Date: Jun. 30, 2021

(87) PCT Pub. No.: WO2022/054173
PCT Pub. Date: Mar. 17, 2022

(65) Prior Publication Data
US 2023/0214908 A1    Jul. 6, 2023

(51) Int. Cl.
*G06Q 30/02* (2023.01)
*G06Q 30/0226* (2023.01)
*G06Q 30/0601* (2023.01)

(52) U.S. Cl.
CPC ..... *G06Q 30/0637* (2013.01); *G06Q 30/0226* (2013.01)

(58) Field of Classification Search
CPC .......... G06Q 30/0637; G06Q 30/0226; G06Q 30/00; G06Q 50/10; G06Q 50/12; G06F 13/00
See application file for complete search history.

(56) References Cited

U.S. PATENT DOCUMENTS

2005/0131752 A1*  6/2005  Gracie ............... G06Q 30/02
                                                      705/7.32
2015/0379570 A1* 12/2015  Argue ............... G06Q 20/047
                                                      705/14.54
(Continued)

FOREIGN PATENT DOCUMENTS

CN    104580451 A    4/2015
CN    108829838 A   11/2018
(Continued)

OTHER PUBLICATIONS

Office Action dated Dec. 14, 2022 issued by the Hong Kong Patent Office in Hong Kong Application No. 22021034091.9.
(Continued)

*Primary Examiner* — Breffni Baggot
(74) *Attorney, Agent, or Firm* — Sughrue Mion, PLLC (57) ABSTRACT

An information processing system includes a first service server that provides a first service. The system includes a communication circuitry and a control circuitry. The communication circuitry communicates with a user terminal of a user not having a first account of the first service and with a second service server that provides a second service different from the first service. The control circuitry sends a purchase request screen to the user terminal when a purchase request for a commodity or service has been received from the user terminal, inquires of the second service server whether or not the user has a second account associated with predetermined identification information of the user when the identification information is entered on the purchase request screen, and sends display information for registering the first account and performing linking processing of the first account and the second account when the user has the associated account.

11 Claims, 7 Drawing Sheets

(56) References Cited

U.S. PATENT DOCUMENTS

| | | |
|---|---|---|
| 2016/0006717 A1 | 1/2016 | Ji |
| 2017/0289131 A1 | 10/2017 | Ji |
| 2018/0159687 A1 | 6/2018 | Yim et al. |
| 2020/0005417 A1* | 1/2020 | Agasi .................. G06F 11/3438 |
| 2021/0279762 A1* | 9/2021 | Eklund .............. G06Q 30/0226 |

FOREIGN PATENT DOCUMENTS

| | | |
|---|---|---|
| CN | 109842616 A | 6/2019 |
| JP | 6377293 B1 | 8/2018 |
| JP | 0625259 B1 | 12/2019 |
| JP | 6625259 B1 | 12/2019 |
| JP | 6674063 B1 * | 4/2020 |
| KR | 10-1218784 B1 | 1/2013 |
| KR | 10-2018-0065359 A | 6/2018 |
| TW | 201327432 A | 7/2013 |
| TW | 201602823 A | 1/2016 |
| WO | 2019/244715 A1 | 12/2019 |

OTHER PUBLICATIONS

Sang-woo Lee, "One-click membership? Pros and Cons of social login", Feb. 15, 2019 Retrieved from the Internet: https://it.donga.com/28724/ (10 pages total).

Office Action issued Jan. 25, 2023 in Korean Application No. 10-2021-7007797.

Office Action dated Jul. 13, 2022 issued by the Taiwanese Patent Office in Taiwanese Application No. 110126048.

Korean Office Action issued Jul. 26, 2023 in Application No. 10-2021-7007797.

Office Action dated Mar. 23, 2022 in Taiwanese Application No. 110126048.

International Search Report for PCT/JP2020/034143 dated Nov. 2, 2020 (PCT/ISA/210).

\* cited by examiner

INFORMATION PROCESSING SYSTEM, INFORMATION PROCESSING METHOD, PROGRAM, AND RECORDING MEDIUM

CROSS REFERENCE TO RELATED APPLICATIONS

This application is a National Stage of International Application No. PCT/JP2020/034143 filed Sep. 9, 2020, the entire contents of which being herein incorporated by reference in its entirety.

TECHNICAL FIELD

The present invention relates to an information processing system, an information processing method, and a program that are capable controlling account linking processing between different services and to a recording medium recording the program.

BACKGROUND ART

From the past, there is known a system that links accounts between services that use user identification systems (accounts, IDs) different from each other.

For example, Patent Literature 1 below has disclosed a configuration in which a first URL including a presenter identifier is generated and a second URL including a user identifier is generated, such that the presenter identifier and the user identifier are acquired in association with each other in a case where access to an information acquisition server has been done with the first URL and the second URL.

CITATION LIST

Patent Literature

Patent Literature 1: Japanese Patent No. 6377293

DISCLOSURE OF INVENTION

Technical Problem

However, in the technology described in Patent Literature 1, the user needs to access the server with both the first URL and the second URL in order to link the accounts, and it takes time and effort to perform the linking processing. Moreover, in order to link the accounts, the user needs to register an account to be linked (perform member registration), and it is troublesome for the user to newly register the account.

In view of the above-mentioned circumstances, it is an object of the present invention to provide an information processing system, an information processing method, a program, and a recording medium that are capable of prompting a user not having an account of an online service to register the account and link to an account of another service without difficulty.

Solution to Problem

In order to accomplish the above-mentioned object, an information processing system according to an embodiment of the present invention is an information processing system including a first service server that provides a first service and includes a communication unit and a control unit. The communication unit is capable of communicating with a user terminal of a user not having a first account of the first service and with a second service server that provides a second service different from the first service. The control unit sends a purchase request screen to the user terminal in a case where a purchase request for a commodity or service has been received from the user terminal. Moreover, the control unit inquires of the second service server or a server associated with the second service server whether or not the user has a second account associated with predetermined identification information of the user in a case where the identification information is entered on the purchase request screen, and sends display information for suggesting to register the first account and to perform linking processing of the first account and the second account to the user terminal in a case where the user has the associated account.

With this configuration, the information processing system suggests to register the first account and link to the second account when the identification information of the user is entered on the purchase request screen for the commodity and the service. In this manner, by using a reward to be obtained from the second service as an incentive, the information processing system can prompt the user not having the first service account to link to the second service account without difficulty and prevent the loss of the opportunity to sell the commodity or service. Here, the predetermined identification information is, for example, a mail address, a telephone number, or the like of the user, though not limited thereto.

The control unit may send the display information in a case where the identification information has been entered and a predetermined percentage of input items other than the identification information has been entered on the purchase request screen.

Accordingly, the information processing system can prompt to perform account linking when the user's input work for purchasing the commodity or service has progressed to some extent, to thereby further alleviate the reluctance of the user to perform the account linking.

The control unit may inquire of the second service server whether or not predetermined information other than the identification information, which has been entered on the purchase request screen, is associated with the second account and sends the display information in a case where the predetermined information is associated with the second account.

Accordingly, the information processing system can more accurately determine whether or not the second account that can be linked exists.

The control unit may send a linking processing execution screen to the user terminal in a case where the control unit has received a request for the linking processing of the first account and the second account before all the input items of the purchase request screen are entered, and send the purchase request screen having one or more input items not entered to the user terminal to replace the linking processing execution screen after the linking processing is completed, the request being transmitted from the user terminal in reply to the display information.

Accordingly, the information processing system can cause the account linking processing to be completed before the purchase processing is completed and cause the purchase processing to be performed in the linked state.

The control unit may send, to the user terminal a completion screen for notifying of completion of the purchase processing and completion of the linking processing simultaneously in a case where the control unit has received a request for the linking processing of the first account and the second account and where the linking processing has been completed and purchase processing based on information entered on the purchase request screen has been completed, the request being transmitted from the user terminal in reply to the display information.

Accordingly, the information processing system can notify the user of the completion of the account linking processing and the completion of the purchase processing with the linked account simultaneously, such that the time and effort to separately notify of both can be saved.

In a case where the purchase processing for the commodity or service based on the purchase request has been completed and the first account and the second account are linked, points depending on a content of the commodity or service may be given to the second account. Here, the control unit may send the display information in a case where the points to be given in accordance with the purchase processing are predetermined points or more.

Accordingly, the information processing system can prompt the user to perform the account linking by using the points to be given as an incentive.

An information processing method according to another embodiment of the present invention is an information processing method that is executed by an information processing system including a first service server that provides a first service, including:
  sending a purchase request screen to the user terminal in a case where a purchase request for a commodity or service has been received from a user terminal of a user not having a first account of the first service;
  inquiring of a second service server that provides a second service different from the first service or a server associated with the second service server whether or not the user has a second account associated with predetermined identification information of the user in a case where the identification information is entered on the purchase request screen; and
  sending display information for suggesting to register the first account and to perform linking processing of the first account and the second account to the user terminal in a case where the user has the associated account.

A program according to another embodiment of the present invention causes an information processing apparatus that functions as a first service server that provides a first service to execute:
  a step of sending a purchase request screen to the user terminal in a case where a purchase request for a commodity or service has been received from a user terminal of a user not having a first account of the first service;
  a step of inquiring of a second service server that provides a second service different from the first service or a server associated with the second service server whether or not the user has a second account associated with predetermined identification information of the user in a case where the 2identification information is entered on the purchase request screen; and
  a step of sending display information for suggesting to register the first account and to perform linking processing of the first account and the second account to the user terminal in a case where the user has the associated account.

A recording medium according to another embodiment of the present invention is a computer-readable recording medium recording a program for recording the above-mentioned program.

Advantageous Effects of Invention

As described above, in accordance with the present invention, it is possible to prompt a user not having an account of an online service to register the account and link to an account of another service without difficulty. It should be noted that the effects do not limit the present invention.

MODE(S) FOR CARRYING OUT THE INVENTION

Hereinafter, an embodiment of the present invention will be described with reference to the drawings.
[System Configuration]

Figure 1:
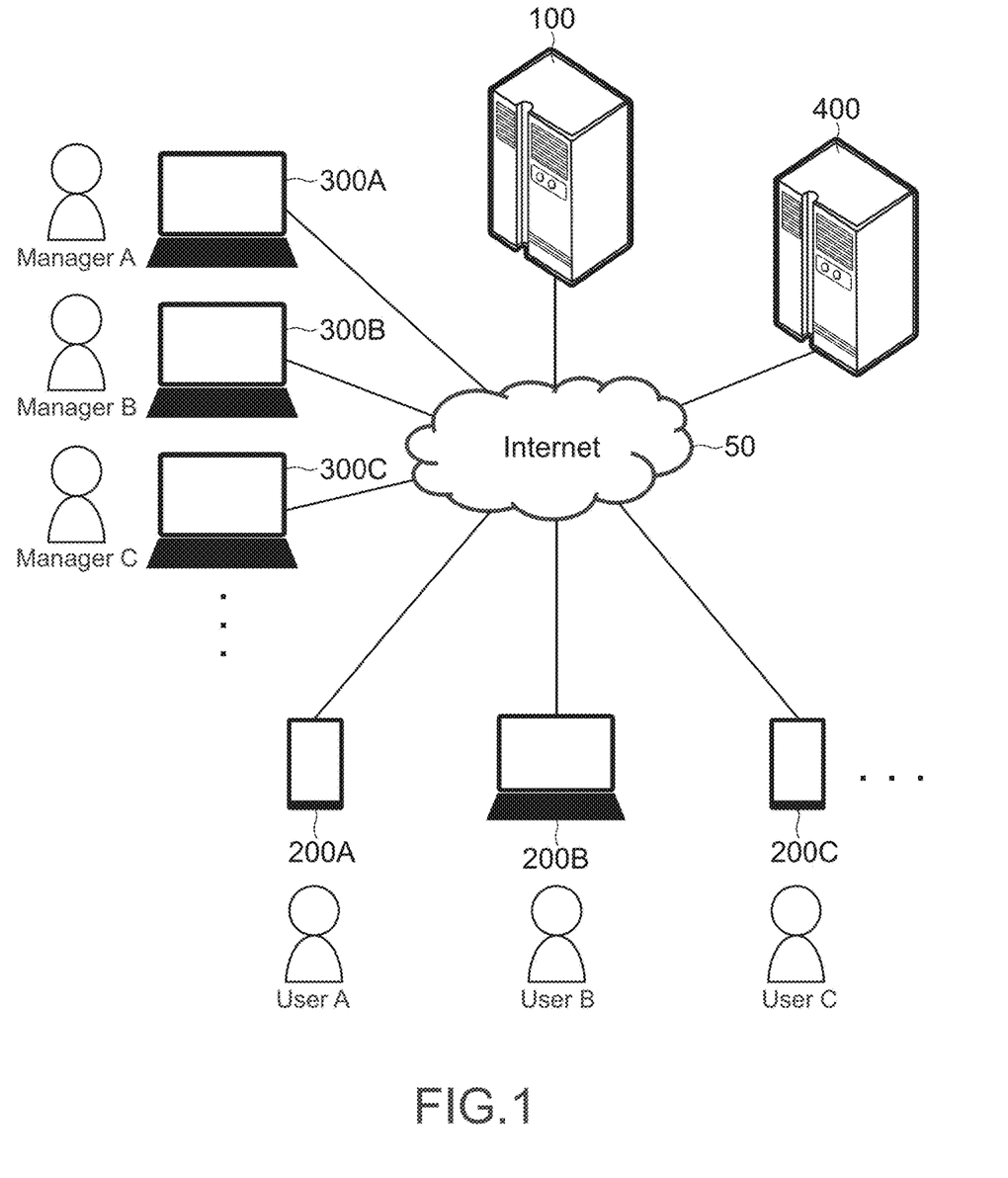
FIG. 1 A diagram showing a configuration of a restaurant information providing system according to an embodiment of the present invention.

FIG. 1 is a diagram showing a configuration of a restaurant information providing system according to this embodiment.

As shown in the figure, this system includes a restaurant information providing server 100 on the Internet 50, a plurality of user terminals 200, a plurality of restaurant terminals 300, and an e-commerce (EC) server 400.

The restaurant information providing server 100 is a webserver that operates a portal site on which restaurant-related information is placed. The restaurant information providing server 100 is connected to the plurality of user terminals 200 and the restaurant terminals 300 of a plurality of restaurants via the Internet 50.

The restaurant information providing server 100 provides a search system of the restaurant information for users of the user terminals 200 on the portal site. Specifically, the restaurant information providing server 100 searches for restaurant information that matches a search condition on the basis of a search request from one of the user terminals 200. Then, the restaurant information providing server 100 generates a webpage on which search results are placed and sends it to the user terminal 200. Moreover, the restaurant information providing server 100 performs reservation reception processing on any restaurant from the user terminal 200 of the user who has viewed the restaurant information, in place of the user.

The user terminal 200 (200A, 200B, 200C . . . ) is a terminal used by a user. The user terminal 200 (200A, 200B, 200C . . . ) is a smartphone, a portable phone, a tablet personal computer (PC), a laptop PC, a desktop PC, or the like, for example. The user terminal 200 accesses the restaurant information providing server 100, receives the webpage, and displays it on the screen through a browser or the like.

The user terminal 200 determines a restaurant search condition on the basis of a user's operation and sends a restaurant search request based on the search condition to the restaurant information providing server 100. In this embodiment, the user of the user terminal 200 can send the search request by selecting a pre-set search condition such as a restaurant location (nearest station), a genre, prices, and the like. Then, based on a user's operation, the user terminal 200 is capable of sending a reservation request of any restaurant displayed as the search result to the restaurant information providing server 100.

In order for the user to use various services such as restaurant reservation via the portal site, the user needs to have an account (ID) as a member of the service provided by the restaurant information providing server 100 and log in the portal site with the account. In a case where the user uses a predetermined service with the account, points depending on the contents of the service are given to (the account of) the user.

Moreover, on the other hand, the restaurant information providing server 100 provides a management screen (webpage) of the restaurant information for restaurants (member restaurants) to be placed on the portal site. Via the management screen, a user of the restaurant terminal 300 can edit and update the restaurant information on the webpage, which is provided to ordinary users as the search result, and upload that webpage to the portal site.

The restaurant terminal 300 (300A, 300B, 300C . . . ) is a terminal installed in each restaurant. The restaurant terminal 300 (300A, 300B, 300C . . . ) is a tablet PC, a laptop PC, a desktop PC, or the like. The restaurant terminal 300 is capable of executing processing on its own restaurant information in communication with the restaurant information providing server 100 on the basis of a manager's operation. The processing on its own restaurant information includes editing and updating the restaurant information.

Moreover, the EC server 400 provides an EC service for members like the restaurant information providing server 100. For using the service provided by the EC server 400, the user of the user terminal 200 needs to have an account as a member and log in the portal site with the account. Also in a case where the user uses a predetermined service with that account, points depending on the contents of the service are given to (the account of) the user.

In this embodiment, the restaurant information providing server 100 is capable of linking an account (hereinafter, a first account) for using a restaurant information providing service provided by the restaurant information providing server 100 and an account (hereinafter, a second account) for using the EC service provided by the EC server 400 by predetermined linking processing. Details of the linking processing will be described later.

Moreover, the restaurant information providing server 100 is capable of controlling points granting processing such that in a case where the user of the user terminal 200 uses the restaurant information providing service, points are given to either of the accounts in accordance with whether or not the first account and the second account have been linked.

[Hardware Configuration of Restaurant Information Providing Server]

Figure 2:
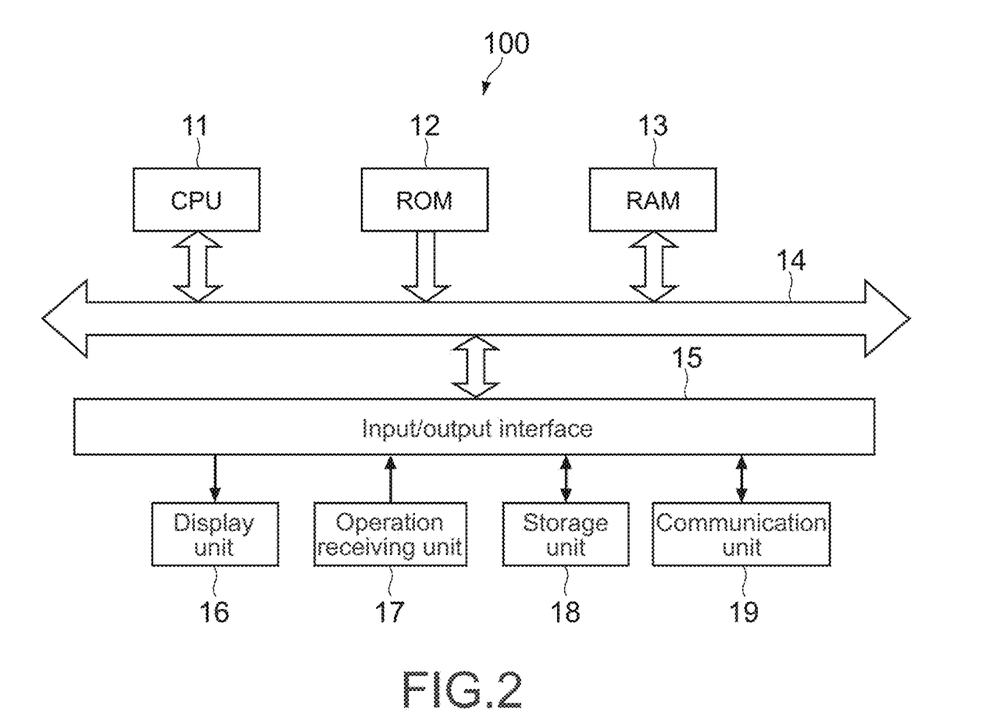
FIG. 2 A diagram showing a hardware configuration of a restaurant information providing server according to the embodiment of the present invention.

FIG. 2 is a diagram showing a hardware configuration of the restaurant information providing server 100. As shown in the figure, the restaurant information providing server 100 includes a central processing unit (CPU) 11, a read only memory (ROM) 12, a random access memory (RAM) 13, an input/output interface 15, and a bus 14 that connects them to one another.

The CPU 11 accesses the RAM 13 or the like as appropriate in a manner that depends on needs. Then, the CPU 11 comprehensively controls all the respective blocks of the restaurant information providing server 100 while performing various types of arithmetic processing. The ROM 12 is a nonvolatile memory in which an OS, firmware such as programs and various parameters to be executed by the CPU 11 are fixedly stored. The RAM 13 is used as a working area of the CPU 11 or the like and temporarily retains the OS, the running various applications, and various types of data being processed.

A display unit 16, an operation receiving unit 17, a storage unit 18, a communication unit 19, and the like are connected to the input/output interface 15.

The display unit 16 is a display device using a liquid crystal display (LCD), an organic electroluminescence display (OELD), a cathode ray tube (CRT), or the like, for example.

The operation receiving unit 17 is a pointing device such as a mouse, a keyboard, a touch panel, and another input device, for example. In a case where the operation receiving unit 17 is a touch panel, the touch panel can be integral with the display unit 16.

The storage unit 18 is a nonvolatile memory such as a hard disk drive (HDD), a flash memory (solid state drive (SSD)), and another solid-state memory, for example. The above-mentioned OS, various applications, and various types of data are stored in the storage unit 18.

As will be described later, particularly in this embodiment, the storage unit 18 includes a restaurant information database, a user information database, and a reservation information database in addition to programs such as applications necessary for account linking processing to be described later.

The communication unit 19 is a network interface card (NIC) for Ethernet or various modules for wireless communication such as wireless LAN, for example. The communication unit 19 serves to perform processing of communication with the user terminals 200.

It should be noted that, although not shown in the figure, the basic hardware configurations of the user terminal 200 and the restaurant terminal 300 are approximately similar to the hardware configuration of the restaurant information providing server 100.

[Database Configuration of Restaurant Information Providing Server]

Figure 3:
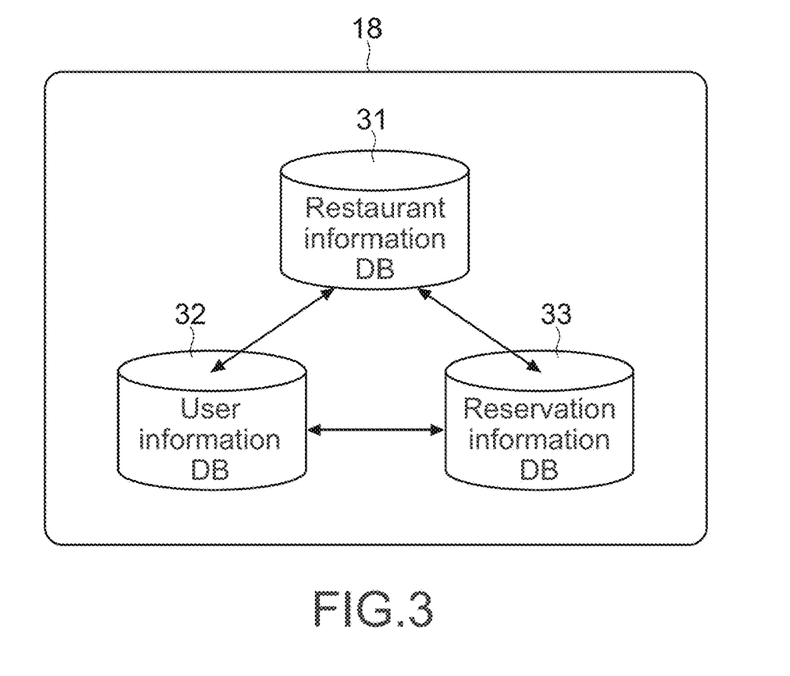
FIG. 3 A diagram showing a configuration of databases of the restaurant information providing server according to the embodiment of the present invention.

FIG. 3 is a diagram showing a configuration of databases of the restaurant information providing server 100.

As shown in the figure, the restaurant information providing server 100 includes a restaurant information database 31, a user information database 32, and a reservation information database 33 in the storage unit 18.

The restaurant information database 31 stores, for each restaurant, the name of that restaurant, location (address or latitude/longitude) information, area information, access information (nearest-station information, information regarding a walking distance from nearest station), a telephone number, an ID for identifying that restaurant (restaurant ID), category information of the type of operation and service of that restaurant, information for presenting that restaurant (information indicating features of the restaurant such as PR text of the restaurant, information regarding an event presented by the restaurant, and the like), image data related to the restaurant (presenting the restaurant), menu information related to menus offered by the restaurant, average budget information, and other information such as business hours and a website URL, and the like. Such information is input through the restaurant terminal 300 of each restaurant via the management screen provided by the restaurant information providing server 100. Moreover, the restaurant information database 31 may store information (reservation list information) indicating reservation availability in each restaurant.

The menu information is information associated with menus to be placed on each restaurant site of the portal site. In the menu information, the menu names of a plurality of menus that each restaurant can offer are stored for each restaurant. The menu information may be stored for each menu category such as appetizer/main and lunch/dinner/course, for example. Moreover, besides as well as text information indicating the menu names, prices, descriptions, and the like, image information of photographs of the menus or the like is also stored as the menu information in association with them.

The area information includes information regarding a plurality of areas different in unit of area. Examples of a wide area can include prefectures and municipalities, examples of a narrow area can include an area within several hundreds of meters from the station (e.g., "Ginza area"), and examples of an intermediate wide area can include an area within 1 km from the station and an area group of a plurality of areas near the station (e.g., "Ginza, Shinbashi, and Yurakucho area"), though not limited thereto. That is, even the same restaurant is associated with a plurality of areas in a manner that depends on its unit of area.

The category information includes, for example, main categories such as Japanese cuisine, Chinese cuisine, Italian cuisine, French cuisine, and Yakiniku (BBQ) and may further include more specific sub-categories such as Yakitori (grilled meat and vegetables skewers), Tempura (deep fried shrimp and vegetables), and the like in Japanese cuisine and pasta, pizza, and the like in Italian cuisine.

The user information database 32 stores information regarding a user who possesses the user terminal 200 and is a user (member) of a restaurant information service via the portal site provided by the restaurant information providing server 100. Specifically, the user information database 32 stores, for each user, information regarding a user ID, a password, the name, a mail address (information that can be another message destination), a telephone number, an address, age (group), sex, the date of birth, and the like. As the user ID, the user's mail address can be used in addition to any character string specified by the user.

Moreover, in a case where the second account linked to the first account exists, the user information database 32 also stores information (hereinafter, link information) regarding the second account in association with the user ID. The link information is stored in a case where a request to link to the second account is sent to the restaurant information providing server 100 from the user terminal 200. Otherwise, in a case where a request to link the first account is sent from the user terminal 200 to the EC server 400 that manages the second account which is a linking destination, the linking information may be received and stored from the EC server 400.

In addition, the user information database 32 also stores information regarding points given to the user. As information regarding those points, information regarding points given to the first account is stored in a case where the second account linked to the first account does not exist. Otherwise, in a case where the second account linked to the first account exists, information regarding points given to the second account as well as the points given to the first account are stored.

Moreover, even in a case where the second account linked to the first account exists, the user information database 32 may store only information regarding the points given to the first account and the EC server 400 or another server associated therewith may store the information regarding the points given to the second account.

The reservation information database 33 stores reservation information (e.g., restaurant name, reservation time, number of costomers, selected course, etc.) included in the reservation request of each restaurant, which has been received from the user terminal 200 via a predetermined reservation form or the like, in association with user information for identifying the user of the user terminal 200.

Those databases are used by cross-referencing in the account linking processing to be described later in a manner that depends on needs, the account linking processing being performed by the restaurant information providing server 100.

[Operation of Restaurant Information Providing Server]

Next, an operation of the restaurant information providing server 100 configured in the above-mentioned manner will be described. The operation is executed by cooperation between the hardware and the software, the hardware including the CPU 11 of the restaurant information providing server 100 and the communication unit 19, the software being stored in the storage unit 18. In the following description, it is assumed that the CPU 11 performs the operation for the sake of convenience.

Figure 4:
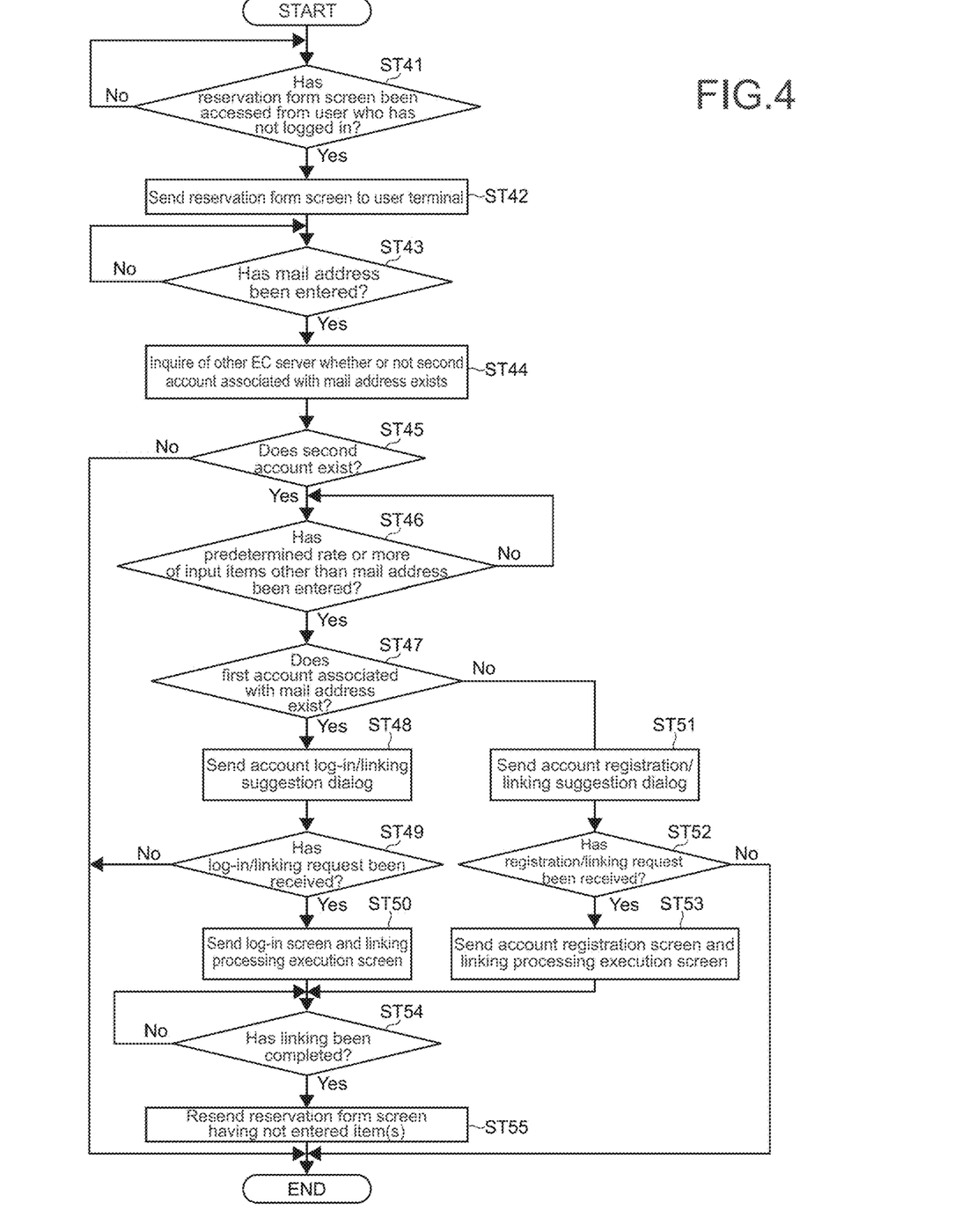
FIG. 4 A flowchart showing a flow of account linking processing by the restaurant information providing server according to the embodiment of the present invention.

FIG. 4 is a flowchart showing the flow of the account linking processing by the restaurant information providing server 100.

As shown in the figure, the CPU 11 determines whether or not a reservation form screen of the restaurant has been accessed from the user terminal 200 in a state not logged in with the first account (Step 41). The reservation form screen is accessed in such a manner that the user of the user terminal 200 presses any one of reservation buttons displayed in a restaurant information field of each restaurant on the portal site, for example.

In a case where the CPU 11 determines that the reservation form screen has been accessed (Yes), the CPU 11 generates a reservation form screen and sends the reservation form screen to the user terminal 200 (Step 42).

Figure 5:
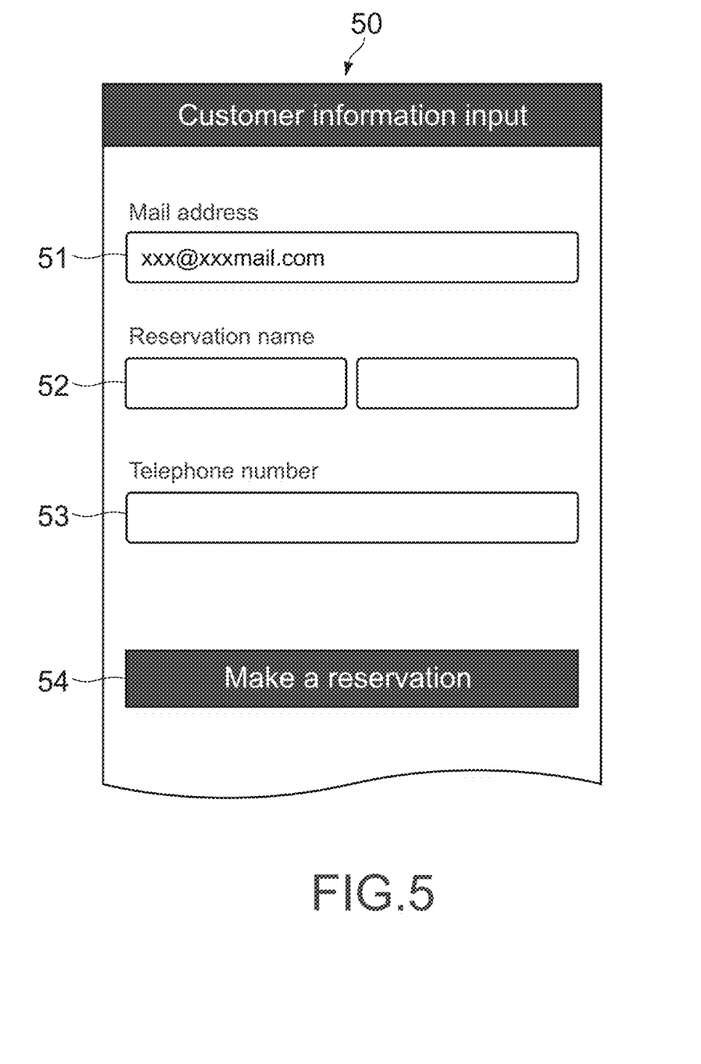
FIG. 5 A diagram showing an example of a restaurant reservation form screen sent and displayed to/on a user terminal by the restaurant information providing server in the embodiment of the present invention.

FIG. 5 is a diagram showing an example of the reservation form screen sent to the user terminal 200 by the restaurant information providing server 100 and displayed on the user terminal 200.

As shown in the figure, a reservation form screen 50 includes, for example, a name input field 51 for entering the name of a reservation person, a mail address input field 52 for entering the mail address of the reservation person, a telephone number input field 53 for entering the telephone number of the reservation person, and a reservation request button 54 for requesting a reservation on the basis of the information entered in each input field.

Subsequently, the CPU 11 determines whether or not the mail address as user identification information has been entered in the mail address input field 52 on the reservation form screen 50 (Step 43). Here, whether or not the mail address has been entered may be determined by, for example, detecting that an input cursor has moved to another input field from the mail address input field 52 or detecting that the duration of a state in which a character is not entered is longer than or equal to a predetermined time (e.g., 10 seconds or the like) after the last character is entered in the mail address input field 52.

In a case where the CPU 11 determines that the mail address has been entered (Yes), the CPU 11 inquires of the EC server 400 whether or not the second account associated with the mail address (account required for logging into the service provided by the EC server 400) exists (Step 44).

Subsequently, the CPU 11 determines whether or not a response indicating that the second account associated with the mail address exists has been received from the EC server 400 (Step 45).

In a case where a response indicating that the associated second account does not exist has been received (No), the CPU 11 terminates the account linking processing.

On the other hand, in a case where the response indicating that the associated second account exists has been received (Yes), the CPU 11 determines whether or not a predetermined percentage or more of the input items other than the mail address has been entered on the reservation form screen 50 (Step 46).

Here, the input items other than the mail address include the name entered in the name input field 51 and the telephone number entered in the telephone number input field 53, which are described above, in this example. Examples of the predetermined percentage include 20%, 50%, 70%, and the like, though not limited thereto. In this example, in a case where, for example, 50%, i.e., one of the name and the telephone number, has been entered, it is determined that the predetermined percentage or more of the input items has been entered.

In a case where the CPU 11 determines that the predetermined percentage or more of the input items other than the mail address has been entered (Yes), the CPU 11 checks whether or not the first account associated with the mail address exists by referring to the user information database 32 (Step 47).

In a case where the CPU 11 determines that the first account associated with the mail address exists (Yes), the CPU 11 generates an account log-in/linking suggestion dialog and sends the account log-in/linking suggestion dialog to the user terminal 200 for displaying the account log-in/linking suggestion dialog (Step 48).

Figure 6:
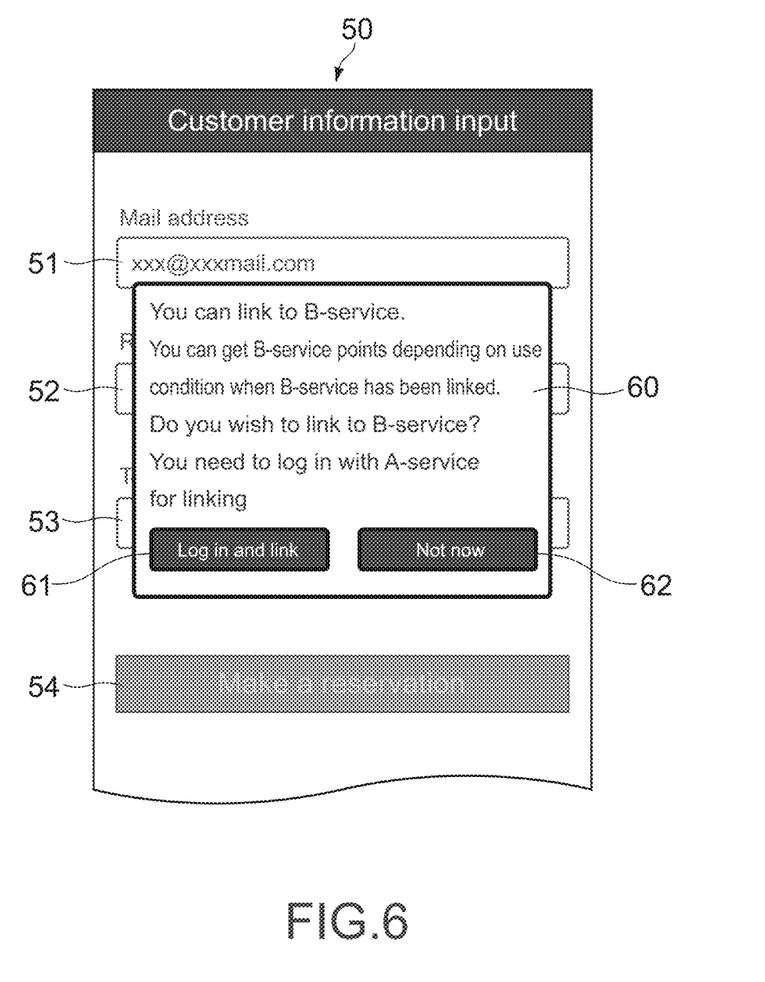
FIG. 6 A diagram showing an example of an account log-in/linking suggestion dialog sent and displayed to/on the user terminal by the restaurant information providing server in the embodiment of the present invention.

FIG. 6 is a diagram showing an example of the account log-in/linking suggestion dialog. As shown in the figure, an account log-in/linking suggestion dialog 60 is displayed superimposed on the reservation form screen 50, for example.

The account log-in/linking dialog 60 includes character information indicating that the first account owned by the user can be linked to the second account and that linking of the account and log-in to the first account are suggested, a log-in/linking button 61 for requesting the linking and log-in, and a non-linking button 62 for returning to the reservation form screen 50 without linking.

The CPU 11 may generate display information for account log-in/linking suggestion not as a dialog but as a separate screen that transitions from the reservation form screen 50.

Subsequently, the CPU 11 determines whether or not a request for log-in with the first account and linking of the first account and the second account have been received by the user of the user terminal 200 pressing the log-in/linking button 61 on the account log-in/linking dialog 60 (Step 49).

In a case where the CPU 11 determines that the CPU 11 has received the log-in and linking request (Yes), the CPU 11 first sends a log-in screen with the first account to the user terminal 200. When log-in information is entered by the user of the user terminal 200 and the log-in request has been received from the user terminal 200, the CPU 11 causes the user terminal 200 to log in with the first account. Subsequently, in a case where the log-in is successful, the CPU 11 generates a linking processing execution screen for performing the linking processing of the first account and the second account and sends the linking processing execution screen to the user terminal 200 (Step 50).

On the other hand, in a case where the CPU 11 determines that the first account associated with the mail address does not exist (No), the CPU 11 generates an account registration/linking suggestion dialog and sends the account registration/linking suggestion dialog to the user terminal 200 for displaying the account registration/linking suggestion dialog (Step 51).

Figure 7:
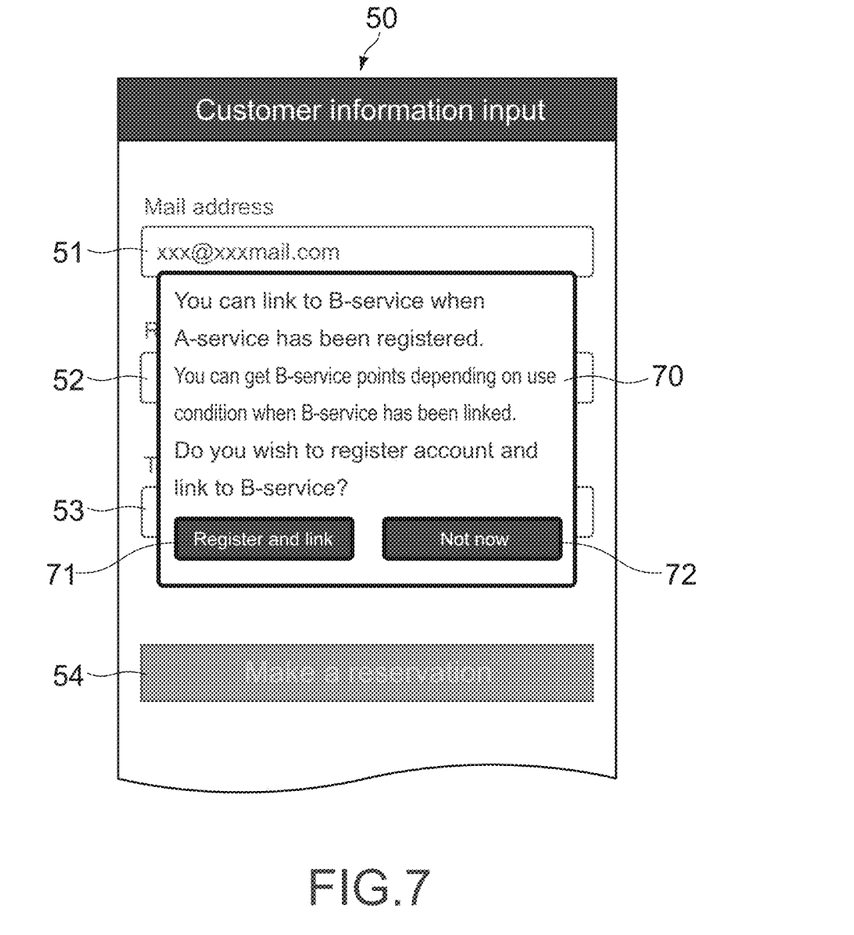
FIG. 7 A diagram showing an example of the account registration/linking suggestion dialog sent and displayed to/on the user terminal by the restaurant information providing server in the embodiment of the present invention.

FIG. 7 is a diagram showing an example of the account registration/linking suggestion dialog. As shown in the figure, an account registration/linking suggestion dialog 70 is also displayed superimposed on the reservation form screen 50, for example.

The account registration/linking suggestion dialog 70 has character information indicating that the first account and the second account can be linked when the first account has been registered and that the registration of the first account and the linking of the first account to the second account are suggested, a registration/linking button 71 for requesting registration/linking of the account, and a non-registration button 72 for returning to the reservation form screen 50 without registering/linking the account.

The CPU 11 may generate display information for the account registration/linking suggestion not as a dialog but as a separate screen for transitioning from the reservation form screen 50.

Subsequently, the CPU 11 determines whether or not a request for registration of the first account and linking of the first account and the second account has been received in such a manner that the user of the user terminal 200 presses the registration/linking button 71 on the account registration/linking dialog 70 (Step 52).

In a case where the CPU 11 determines that the CPU 11 has received the registration/linking request (Yes), the CPU 11 first sends a registration screen for the first account to the user terminal 200. When the user of the user terminal 200 has entered registration information (user name, mail address, telephone number, and the like) and the CPU 11 has received a registration request from the user terminal 200, the CPU 11 registers the registration information as first account information in the user information database 32. Subsequently, the CPU 11 generates a linking processing execution screen for performing the linking processing of the registered first account and the second account, and sends the linking processing execution screen to the user terminal 200 (Step 53).

Figure 8:
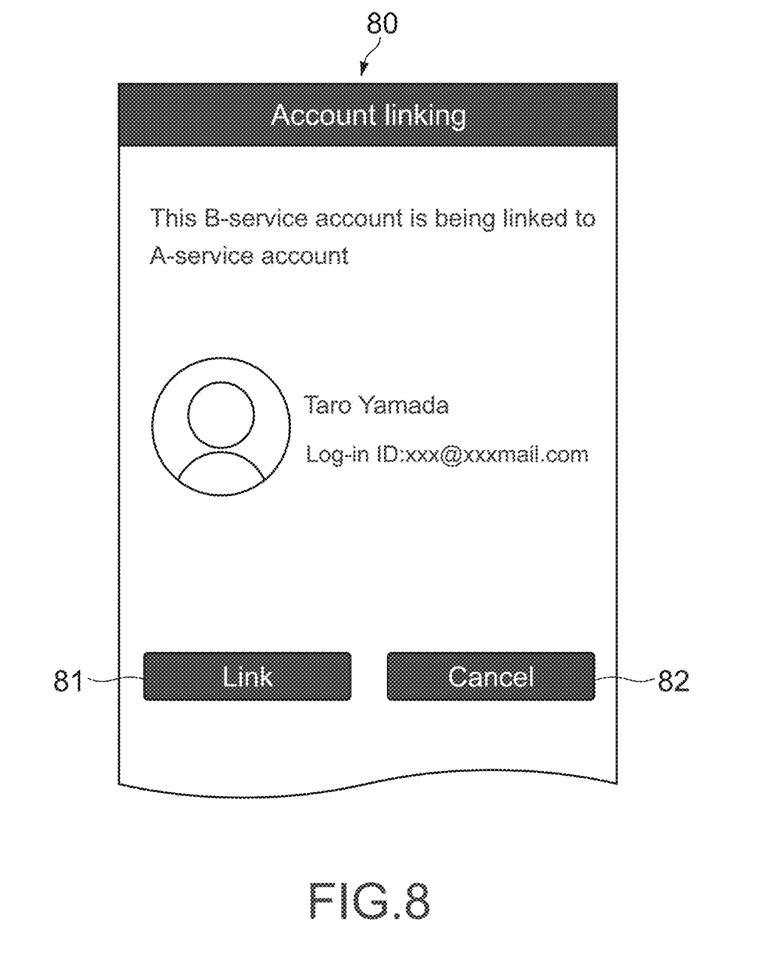
FIG. 8 A diagram showing an example of an account linking processing execution screen sent and displayed to/on the user terminal by the restaurant information providing server in the embodiment of the present invention.

FIG. 8 is a diagram showing an example of the linking processing execution screen. As shown in the figure, the CPU 11 sends a linking processing execution screen 80 to the user terminal 200 in a case where the log-in is successful in response to the log-in/linking request and the account registration processing has been completed in response to the registration/linking request. As shown in the figure, the linking processing execution screen 80 includes a message for confirming whether or not to perform the linking processing of the second account and the first account, a linking button 81 for performing the linking processing, and a cancel button 82 for canceling the linking processing as well as information regarding the second account such as the user name and the user ID (mail address).

The CPU 11 performs the linking processing when the CPU 11 receives a link execution request from the user terminal 200 in such a manner that the linking button 81 is pressed on the linking processing execution screen 80. Specifically, the CPU 11 receives information regarding the second account by communication with the EC server 400 and stores the information regarding the second account in the user information database 32 in association with information regarding the first account.

In a case where the CPU 11 determines that the linking processing has been completed (Yes in Step 50), the CPU 11 resends the reservation form screen 50 having one or more input items not entered to the user terminal 200 for transitioning from the linking processing execution screen 80 to the reservation form screen 50 (Step 51).

Thus, the user of the user terminal 200 can enter the remaining input items on the reservation form screen 50 and send the reservation request of the restaurant to the restaurant information providing server 100 to thereby obtain points associated with the second account in accordance with the reservation contents. That is, when the restaurant information providing server 100 receives the reservation request, the restaurant information providing server 100 stores the reservation-related information in the reservation information database 33 and requests the EC server 400 to perform points granting processing for the second account with the reservation-related information. The request for the points granting processing may be performed collectively not for each reservation request but for a plurality of reservations periodically, for example, once a day, once a week, or the like.

Alternatively, in a case where after the completion of the account linking, the CPU 11 has received the reservation request based on the information entered on the reservation form screen 50 and has completed the reservation, the CPU 11 may generate a completion screen for simultaneously notifying of the completion of the reservation (service purchase) and the completion of the account linking (and the completion of the account registration) and may send the completion screen to the user terminal 200. Accordingly, the time and effort to separately notify the user of the completion of the account linking processing (and the account registration processing) and the completion of the purchase processing with the linked account can be saved.

Conclusion

As described above, in accordance with this embodiment, the restaurant information providing server 100 suggests to log in with the first account or register the first account and to link to the second account at a timing when the user identification information (mail address) is entered on the reservation form screen 50. In this manner, by using a reward to be obtained from the second service as an incentive, the restaurant information providing server 100 can prompt the user who has not logged in with the first service account or the user who does not have the first service account to link to the second service account without difficulty and prevent the loss of the opportunity to provide the service.

Modified Examples

The present invention is not limited to the above-mentioned embodiment and can be variously modified without departing from the gist of the present disclosure.

Although in the above-mentioned embodiment, the example in which the present invention is applied to the reservation form screen in the reservation processing of the restaurant has been shown, the present invention is not limited thereto. The present invention can be applied to a purchase request screen for requesting the purchase (use) of any other services or commodities.

Although in the above-mentioned embodiment, the presence or absence of the second account associated with the mail address as the user identification information is inquired to the EC server 400, the presence or absence of the second account associated with other user identification information, such as the telephone number, may be inquired.

In the above-mentioned embodiment, the restaurant information providing server 100 may determine whether or not there is a log-in history with the first account within a predetermined period of time (e.g., one day, one week, one month, etc.) before the reception of the reservation request on the reservation form 50 from the user terminal 200, and may be configured not to generate the account log-in/linking dialog 60 even if the associated second account exists in a case where there is a log-in history. Accordingly, in a case where there is a reservation request without logging in despite the presence of a history of log-in with the first account immediately before, the restaurant information providing server 100 considers that there is a possibility of spoofing and does not suggest to link the account, such that damage of illegal acquisition of points or the like can be prevented.

In the above-mentioned embodiment, the restaurant information providing server 100 inquires of whether or not second account associated with the EC server 400 exists by using the mail address of the user as a key. In addition to the mail address, the restaurant information providing server 100 may inquire of the EC server 400 whether or not predetermined information (e.g., telephone number, etc.) other than the mail address, which has been entered on the reservation form screen 50, is associated with the second account, and may generate and send the account log-in/linking suggestion dialog 60 or the account registration/linking suggestion dialog 70 in a case where the predetermined information is associated with the second account. Accordingly, whether or not the second account that can be linked exists can be determined more accurately.

In the above-mentioned embodiment, when the mail address is entered by the user on the reservation form screen 50, whether or not the second account exists is checked regardless of the reservation contents, and the account log-in/linking suggestion dialog 60 or the account registration/linking suggestion dialog 70 is generated. However, the restaurant information providing server 100 may determine points to be given to the second account in accordance with the reservation (purchase processing of commodity or service), and may generate and send the account log-in/linking suggestion dialog 60 or the account registration/linking suggestion dialog 70 only in a case where those points are predetermined points or more. Accordingly, the restaurant information providing server 100 can prompt the user to link the first account and the second account by using relatively many points to be given through the link as an incentive.

Although in the above-mentioned embodiment, the restaurant information providing server 100 inquires the EC server 400 for the presence or absence of the second account associated with the first account, the presence or absence of the second account may be inquired to another server associated with the EC server 400 instead of directly inquiring the EC server 400. It is because, for example, in a case where a plurality of service providers have a common account system, it is conceivable that an entity that provides services to users is different from an entity that manages accounts.

Moreover, when the restaurant information providing server 100 inquires about the presence or absence of the second account to the EC server 400 or another server associated therewith, it is conceivable that the EC server 400 or the server associated therewith is operated by an organization different from (e.g., not capital-related to) an organization that operates the restaurant information providing server 100. In such a case, the restaurant information providing server 100 may not be able to access the EC server 400 or the server associated therewith from the viewpoint of security. In such a case, when inquiring of whether or not the second account exists, the restaurant information providing server 100 may perform access permission (access right setting) processing with the EC server 400 or (the database of) the server associated therewith.

In the above-mentioned embodiment, the restaurant information providing server 100 checks whether or not the first account associated with the mail address exists after inquiring the EC server 400 of whether or not the second account associated with the mail address entered by the user exists. However, the restaurant information providing server 100 may inquire of the presence or absence of the associated second account to the EC server 400 after checking whether or not the first account associated with the entered mail address exists.

Regarding inventions each recited as an "information processing method" of the inventions defined in the scope of claims of this patent application, at least one apparatus such as a computer automatically performs the respective steps through information processing based on software and a person does not perform those steps by using the apparatus such as the computer. That is, such an "information processing method" is not a method for a person to operate a calculation tool such as the computer, but an information processing method for the computer and the software.

In the above-mentioned embodiment, the program for executing the account linking processing may be stored in the storage unit 18, may be stored in a computer-readable portable recording medium (e.g., semiconductor memory, optical disc, or the like), traded independently of the restaurant information providing server 100, and distributed to a market, or may be sent to not only Japan but also overseas in accordance with an electronic order via the Internet or the like, for example.

REFERENCE SIGNS LIST

11 CPU
18 storage unit
19 communication unit
31 restaurant information database
32 user information database
33 reservation information database
50 reservation form screen
51 name input field
52 mail address input field
53 telephone number input field
60 account log-in/linking suggestion dialog
61 log-in and linking button
70 account registration/linking suggestion dialog
71 registration and linking button
80 linking processing execution screen
100 restaurant information providing server
200 user terminal
300 restaurant terminal
400 another EC server

The invention claimed is:

1. An information processing system including a first service server that is configured to provide a first service, the first service server comprising:
   communication circuitry configured to communicate with a user terminal of a user who does not have a first account of the first service and with a second service server that provides a second service different from the first service;
   a processor; and
   a memory storing instructions that, when executed by the processor, cause the processor of the first service server to:
      receive a purchase request for a commodity or service from the user terminal which is not logged in with the first service,
      send purchase request information based on the purchase request to the user terminal to cause the user terminal to display a purchase request screen,
      receive first identification information of the user based on a first input field of the purchase request screen,
      inquire, based on the identification information, of the second service server or a server associated with the second service server whether or not the user has a second account associated with the first identification information,
      receive a response from the second service server indicating whether the user has the second account,
      send display information to the user terminal to cause the user terminal to display a request to register the first account and to perform linking processing of the first account and the second account based on the user having the second account, and
      link the first account and the second account based on receiving a confirmation from the user terminal to perform the linking processing,
   wherein the processor is further configured to execute the instructions to cause the processor to determine whether the first identification information has been entered based on receiving completion information indicating an input cursor on the user terminal moved to a second input field after a last character was entered in the first input field.

2. The first service server according to claim 1, wherein the processor is further configured to execute the instruction to cause the processor to send the display information based on the first identification information and a predetermined percentage of one or more input items other than the first identification information being entered on the purchase request screen.

3. The first service server according to claim 1,
wherein the processor is further configured to execute the instructions to inquire of the second service server whether or not predetermined information other than the first identification information, which has been entered on the purchase request screen, is associated with the second account and sends the display information to the user terminal in a case where the predetermined information is associated with the second account.

4. The first service server according to claim 1, wherein the control circuitry is further configured to:
send linking processing information to the user terminal to cause the user terminal to display a linking processing execution screen in a case where the control circuitry has received a request for the linking processing of the first account and the second account before all of one or more input items of the purchase request screen are entered, and
send the purchase request information to cause the user terminal to display the purchase request screen having one or more of the input items not entered, to the user terminal, to replace the linking processing execution screen after the linking processing is completed, the request being transmitted from the user terminal in reply to the display information.

5. The first service server according to claim 1,
wherein the processor is further configured to execute the instructions to send, to the user terminal, completion information to cause the user terminal to display a completion screen for notifying of completion of purchase processing and completion of the linking processing simultaneously in a case where the control circuitry has received a request for the linking processing of the first account and the second account and where the linking processing has been completed and the purchase processing based on information entered on the purchase request screen has been completed, the request being transmitted from the user terminal in reply to the display information.

6. The first service server according to claim 1,
wherein, the processor is further configured to execute the instructions to: give points to the second account depending on a content of the commodity or service, and
send the display information to the user terminal in a case where the points to be given in accordance with purchase processing are predetermined points or more,
in a case where the purchase processing for the commodity or service based on the purchase request has been completed and the first account and the second account are linked.

7. An information processing method that is executed by a first service server that provides a first service, comprising:
receiving a purchase request for a commodity or service from a user terminal which is not logged in with the first service;
sending purchase request information based on the purchase request to the user terminal to cause the user terminal to display a purchase request screen;
receiving first identification information of a user through-based on a first input field of the purchase request screen;
inquiring, based on the identification information, of a second service server that provides a second service different from the first service or a server associated with the second service server whether or not the user has a second account associated with the first identification information; and
receiving a response from the second service server indicating whether the user has the second account;
sending display information to the user terminal to cause the user terminal to display a request to register a first account and to perform linking processing of the first account and the second account based on the user having the second account; and
linking the first account and the second account based on receiving a confirmation from the user terminal to perform the linking processing,
wherein the receiving the first identification information comprises determining whether the first identification information has been entered based on receiving completion information indicating an input cursor on the user terminal moved to a second input field after a last character was entered in the first input field.

8. A non-transitory computer-readable storage medium storing a program for executing:
receiving a purchase request for a commodity or service from a user terminal which is not logged in with a first service;
sending purchase request information based on the purchase request to the user terminal to cause the user terminal to display a purchase request screen;
receiving first identification information of a user based on a first input field of the purchase request screen;
inquiring, based on the identification information, of a second service server that provides a second service different from the first service or a server associated with the second service server whether or not the user has a second account associated with the first identification information;
receiving a response from the second service server indicating whether the user has the second account;
sending display information to the user terminal to cause the user terminal to display a request to register a first account and to perform linking processing of the first account and the second account based on the user having the second account; and
linking the first account and the second account based on receiving a confirmation from the user terminal to perform the linking processing,
wherein the receiving the first identification information comprises determining whether the first identification information has been entered based on receiving completion information indicating an input cursor on the user terminal moved to a second input field after a last character was entered in the first input field.

9. The first service server according to claim 1,
wherein the processor is further configured to execute the instructions to determine whether the first identification information has been entered based on a duration of a state in which a character is not entered being longer than or equal to a predetermined time after a last character is entered in a first input field for the first identification information.

10. The first service server according to claim 1, wherein the processor is further configured to execute the instructions to:
receive second identification information of the user through the purchase request screen in a case where the second account cannot be determined based on the first identification information;

inquire, based on the second identification information, of the second service server or the server associated with the second service server whether or not the user has the second account associated with the second identification information;

receive a response from the second service server indicating whether the user has the second account, send the display information to the user terminal to cause the user terminal to display a request to register the first account and to perform the linking processing of the first account and the second account based on the user having the second account; and link the first account and the second account based on receiving the confirmation from the user terminal to perform the linking processing.

11. The first service server according to claim 1, wherein the processor is further configured to execute the instructions to determine whether there is not a log-in history with the first account within a predetermined period of time before suggesting to perform linking processing of the first account and the second account.

\* \* \* \* \*